United States Patent
Wallman et al.

(10) Patent No.: US 7,117,489 B2
(45) Date of Patent: Oct. 3, 2006

(54) OPTIONAL ATTRIBUTE GENERATOR FOR CUSTOMIZED JAVA PROGRAMMING ENVIRONMENTS

(75) Inventors: David Wallman, Sunnyvale, CA (US); Stepan Sokolov, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 742 days.

(21) Appl. No.: 09/886,178

(22) Filed: Jun. 20, 2001

(65) Prior Publication Data

US 2003/0018958 A1 Jan. 23, 2003

(51) Int. Cl.
G06F 9/45 (2006.01)
G06F 9/44 (2006.01)

(52) U.S. Cl. .................. 717/148; 717/118; 717/151

(58) Field of Classification Search .............. 717/1, 717/148, 151, 176; 709/206
See application file for complete search history.

(56) References Cited

U.S. PATENT DOCUMENTS

| | | | |
|---|---|---|---|
| 5,848,274 A | 12/1998 | Hamby et al. | |
| 5,893,118 A | 4/1999 | Sonderegger | |
| 5,943,496 A * | 8/1999 | Li et al. ................. | 719/328 |
| 6,061,743 A | 5/2000 | Thatcher et al. | |
| 6,083,279 A | 7/2000 | Cuomo et al. | |
| 6,158,048 A | 12/2000 | Lueh et al. | |
| 6,209,018 B1 | 3/2001 | Ben-Shachar et al. | |
| 6,237,135 B1 | 5/2001 | Timbol | |
| 6,295,638 B1 | 9/2001 | Brown et al. | |
| 6,336,213 B1 | 1/2002 | Beadle et al. | |
| 6,339,841 B1 | 1/2002 | Merrick et al. | |
| 6,385,769 B1 | 5/2002 | Lewallen | |
| 6,412,107 B1 * | 6/2002 | Cyran et al. ............. | 717/148 |
| 6,429,860 B1 | 8/2002 | Hughes | |
| 6,442,558 B1 | 8/2002 | Brown et al. | |
| 6,446,254 B1 | 9/2002 | Chapman et al. | |
| 6,453,342 B1 | 9/2002 | Himmel et al. | |

(Continued)

FOREIGN PATENT DOCUMENTS

EP   1076301 A2   2/2001

(Continued)

OTHER PUBLICATIONS

Pominville, Patrice, "Annotating Java Bytecode", 2000, *McGill University, 308-621 Optimizing Compilers, Project Report*, pp. 1-7. XP-002252576.

(Continued)

*Primary Examiner*—Wei Zhen
*Assistant Examiner*—Chih-Ching Chow
(74) *Attorney, Agent, or Firm*—Beyer Weaver & Thomas, LLP

(57) ABSTRACT

Techniques for customization of JAVA runtime environments are disclosed. The techniques can be used to provide JAVA runtime environments that are specifically tailored for various JAVA applications. Accordingly, for a particular JAVA application, an optimized runtime environment can be created. One or more optional attributes which represent the desired runtime customizations are generated. As will be appreciated, the optional attributes can be generated in the attribute table in the class file. The optional attributes can then be parsed and appropriate features can be loaded into the virtual machine. In this way, JAVA runtime environments can be customized based on a particular JAVA application requirement. Moreover, customizations can be automated using a runtime performance manager that interacts with various other components that operate to first generate and then load optional attributes into the JAVA runtime environment.

30 Claims, 6 Drawing Sheets

U.S. PATENT DOCUMENTS

| | | |
|---|---|---|
| 6,463,578 B1 | 10/2002 | Johnson |
| 6,510,551 B1 | 1/2003 | Miller |
| 6,523,168 B1 | 2/2003 | Arnold et al. |
| 6,581,077 B1 | 6/2003 | Sokolov et al. |
| 6,584,612 B1 | 6/2003 | Mueller et al. |
| 6,658,573 B1 | 12/2003 | Bischof et al. |
| 6,675,371 B1 | 1/2004 | York et al. |
| 6,704,746 B1 | 3/2004 | Sokolov et al. |
| 6,704,927 B1 | 3/2004 | Bak et al. |
| 6,721,740 B1 | 4/2004 | Skinner et al. |
| 6,742,109 B1 | 5/2004 | Sokolov et al. |
| 6,769,015 B1 * | 7/2004 | Bates et al. ................. 709/206 |
| 2002/0087589 A1 | 7/2002 | Wallman |
| 2004/0172619 A1 | 9/2004 | Woolen et al. |

FOREIGN PATENT DOCUMENTS

| | | |
|---|---|---|
| EP | 1124183 A1 | 8/2001 |
| WO | WO03/104980 A2 | 12/2003 |

OTHER PUBLICATIONS

Hummel, Joseph et al., "Annotating the Java bytecodes in support of optimization", 1997, *Concurrency: Practice and Experience*, vol. 9, No. 11, pp. 1003-1016. XP-001131083.

Lindholm et al, "The Java™ Virtual Machine Specification", (Sep. 1996), Sun Microsystems, Inc., Chapters 1-10 (173 pp.).

Sun Microsystems: "Java Card 2.1.1 Virtual Machine Specification" May 18, 2000, XP002290969.

Info-Zip: "Info-Zip application note" Mar. 11, 1997, XP002290913.

Tis Committee: "Executable and linking format (ELF) specification" May 1995, XP002290914.

Prominville et al. "A framework for optimizing java using attributes", Proc. Of the 2000 conf. of the center for advance studies on collaborative resh, Nov. 2000, pp. 1-17.

Krintz et al. "Reducing transfer delay using java class file splitting and prefetching", ACM OOPSLA, pp. 276-291.

Kazi et al. "Techniques for obtaining high performance in java programs", ACM Computing Surveys, vol. 32, No. 3, Sep. 2000, pp. 213-240.

Benton et al. "Compiling standard ML to java bytecodes", ACM ICFP 1998, pp. 129-140.

Alpern et al., "Implementing Jalapeno in Java", ACM OOPSLA, pp. 314-324.

Stephenson et al. "A quantitative analysis of the performance impact of specialized bytecodess in Java", Proc. Of the 2004 conference of the center for advance studies on collaborative Resh, Oct. 2004, pp. 267-281.

* cited by examiner

OPTIONAL ATTRIBUTE GENERATOR FOR CUSTOMIZED JAVA PROGRAMMING ENVIRONMENTS

CROSS-REFERENCE TO RELATED APPLICATIONS

This application is related to U.S. patent application Ser. No. 09/886,440, entitled "CUSTOMIZATION OF JAVA RUNTIME ENVIRONMENTS", filed concurrently herewith, and hereby incorporated herein by reference.

This application is also related to U.S. Pat. No. 6,799,185, entitled "FRAMEWORKS FOR ACCESSING JAVA CLASS FILES", filed May 9, 2001, and hereby incorporated herein by reference.

BACKGROUND OF THE INVENTION

The present invention relates generally to object-based high level programming environments, and more particularly, to techniques suitable for customization of a JAVA runtime environment.

One of the goals of high level languages is to provide a portable programming environment such that the computer programs may easily be ported to another computer platform. High level languages such as "C" provide a level of abstraction from the underlying computer architecture and their success is well evidenced from the fact that most computer applications are now written in a high level language.

Portability has been taken to new heights with the advent of the World Wide Web ("the Web") which is an interface protocol for the Internet which allows communication between diverse computer platforms through a graphical interface. Computers communicating over the Web are able to download and execute small applications called applets. Given that applets may be executed on a diverse assortment of computer platforms, the applets are typically executed by a JAVA™ virtual machine.

Recently, the JAVA programming environment has become quite popular. The JAVA programming language is a language that is designed to be portable enough to be executed on a wide range of computers ranging from small devices (e.g., pagers, cell phones and smart cards) up to supercomputers. Computer programs written in the JAVA programming language (and other languages) may be compiled into JAVA Bytecode instructions that are suitable for execution by a JAVA virtual machine implementation. The JAVA virtual machine is commonly implemented in software by means of an interpreter for the JAVA virtual machine instruction set but, in general, may be software, hardware, or both. A particular JAVA virtual machine implementation and corresponding support libraries together constitute a JAVA runtime environment.

Computer programs in the JAVA programming language are arranged in one or more classes or interfaces (referred to herein jointly as classes or class files). Such programs are generally platform, i.e., hardware and operating system, independent. As such, these computer programs may be executed without modification on any computer that is able to run an implementation of the JAVA runtime environment.

Object-oriented classes written in the JAVA programming language are compiled to a particular binary format called the "class file format." The class file includes various components associated with a single class. These components can be, for example, methods and/or interfaces associated with the class. In addition, the class file format can include a significant amount of ancillary information that is associated with the class. The class file format (as well as the general operation of the JAVA virtual machine) is described in some detail in The Java Virtual Machine Specification, Second Edition, by Tim Lindholm and Frank Yellin, which is hereby incorporated herein by reference.

FIG. 1A shows a progression of a simple piece of a JAVA programming language source code 101 through execution by an interpreter, the JAVA virtual machine. The JAVA programming language source code 101 includes the classic Hello World program written in JAVA. The source code is then input into a Bytecode compiler 103 that compiles the source code into Bytecodes. The Bytecodes are virtual machine instructions as they will be executed by a software emulated computer. Typically, virtual machine instructions are generic (i.e., not designed for any specific microprocessor or computer architecture) but this is not required. The Bytecode compiler outputs a JAVA class file 105 that includes the Bytecodes for the JAVA program. The JAVA class file is input into a JAVA virtual machine 107. The JAVA virtual machine is an interpreter that decodes and executes the Bytecodes in the JAVA class file. The JAVA virtual machine is an interpreter, but is commonly referred to as a virtual machine as it emulates a microprocessor or computer architecture in software (e.g., the microprocessor or computer architecture may not exist in hardware).

FIG. 1B illustrates a simplified class file 100. As shown in FIG. 1B, the class file 100 includes a constant pool 102 portion, interfaces portion 104, fields portion 106, methods portion 108, and attributes portion 110. The attributes (or attributes table) 110 portion represents the attributes associated with the class file 100. This allows for one or more attributes to be defined, each of which can be associated with one or more components of the class file. As is known to those skilled in the art, the JAVA virtual machine implementations are allowed to define and use various attributes. In addition, the virtual machine's implementations ignore attributes that they do not recognize. Thus, a class file may contain one or more attributes, all or none of which may be recognized by a particular virtual machine implementation.

As is known to those skilled in the art, execution of a JAVA application typically requires various JAVA features to be available at runtime. Unfortunately, however, one problem with conventional virtual machine implementation is that typically most of the available features are loaded regardless of whether they are going to be used at runtime by a particular JAVA application. This, of course, can result in a grossly inefficient use of system resources. In some circumstances, particularly in systems with limited computing power and/or memory, this inefficient use of resources is a serious disadvantage. As such, it is highly desirable to customize JAVA runtime environments so as to optimize performance of JAVA applications.

Accordingly, there is a need for techniques that allow customization of JAVA runtime environment of virtual machines that operate with limited computing power and/or memory (e.g., embedded systems).

SUMMARY OF THE INVENTION

Broadly speaking, the invention relates to improved techniques for customization of JAVA runtime environments. The techniques can be used to provide JAVA runtime environments that are specifically tailored for various JAVA applications. Accordingly, for a particular JAVA application, an optimized runtime environment can be created. In accordance with one aspect of the invention, one or more optional attributes which represent the desired runtime customizations are generated. As will be appreciated, the optional attributes can be generated in the attribute table in the class file. The optional attributes can then be parsed and appropriate features can be loaded into the virtual machine. In this way, JAVA runtime environments can be customized based on a particular JAVA application requirement. Moreover, customizations can be automated using a runtime performance manager that interacts with various other components that operate to first generate and then load optional attributes into the JAVA runtime environment.

The invention can be implemented in numerous ways, including as a method, an apparatus, a computer readable medium, and a database system. Several embodiments of the invention are discussed below.

As a method for generating optional attributes in a JAVA class file, one embodiment of the invention includes the acts of: receiving as input a JAVA runtime optimization; generating one or more optional attributes based on the JAVA runtime optimization; and writing the one or more optional attributes in an attribute table portion of a JAVA class file.

As a JAVA computing environment one embodiment of the invention includes a JAVA optional attribute generator suitable for generation of optional attributes in a JAVA class file. The JAVA optional attribute generator operates to: receive as input a JAVA runtime optimization; generate one or more optional attributes based on the JAVA runtime optimization; and write the one or more optional attributes in an attribute table portion of a JAVA class file.

As a computer readable medium including computer program code for generating optional attributes in a JAVA class file, one embodiment of the invention includes computer program code for receiving as input a JAVA runtime optimization; computer program code for generating one or more optional attributes based on the JAVA runtime optimization; and computer program code for writing the one or more optional attributes in an attribute table portion of a JAVA class file.

These and other aspects and advantages of the present invention will become more apparent when the detailed description below is read in conjunction with the accompanying drawings.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The present invention pertains to improved techniques for customization of JAVA runtime environments. The techniques can be used to provide JAVA runtime environments that are specifically tailored for various JAVA applications. Accordingly, for a particular JAVA application, an optimized runtime environment can be created. In accordance with one aspect of the invention, one or more optional attributes which represent the desired runtime customizations are generated. As will be appreciated, the optional attributes can be generated in the attribute table in the class file. The optional attributes can then be parsed and appropriate features can be loaded into the virtual machine. In this way, JAVA runtime environments can be customized based on a particular JAVA application requirement. Moreover, customizations can be automated using a runtime performance manager that interacts with various other components that operate to first generate and then load optional attributes into the JAVA runtime environment.

One component is an optional attribute generator that operates to generate optional attributes that represent desired optimizations for a JAVA runtime environment. The optional attribute generator can, among other things, generate programming code that implements an Application Programming Interface (API) suitable for accessing the optional attributes that are stored in the JAVA class file. In addition, the optional attribute generator can perform a variety of other tasks, for example, it can access a database to receive optimizations as input and update the database after the optional attributes are generated.

Embodiments of the invention are discussed below with reference to FIGS. 2–5. However, those skilled in the art will readily appreciate that the detailed description given herein with respect to these figures is for explanatory purposes only as the invention extends beyond these limited embodiments.

Figure 1A:
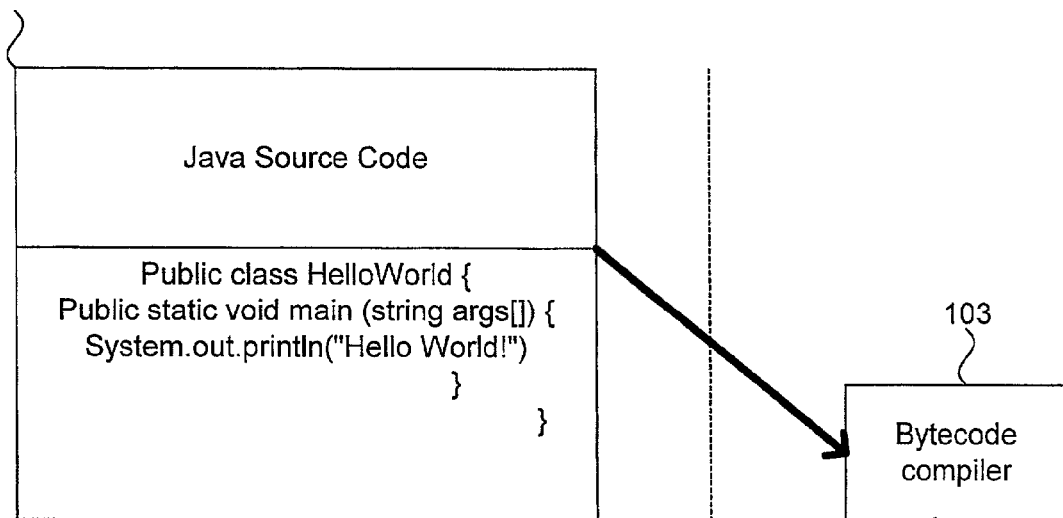
FIG. 1A shows a progression of a simple piece of a JAVA source code through execution by an interpreter, the JAVA virtual machine.
Figure 1A:
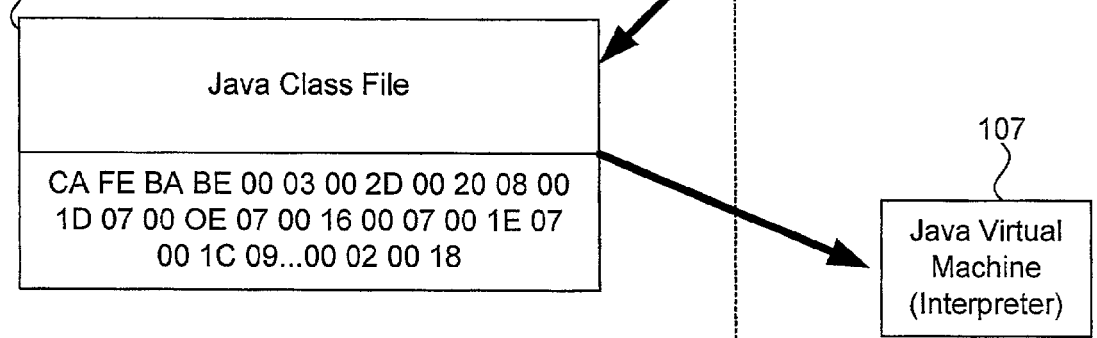
Figure 1B:
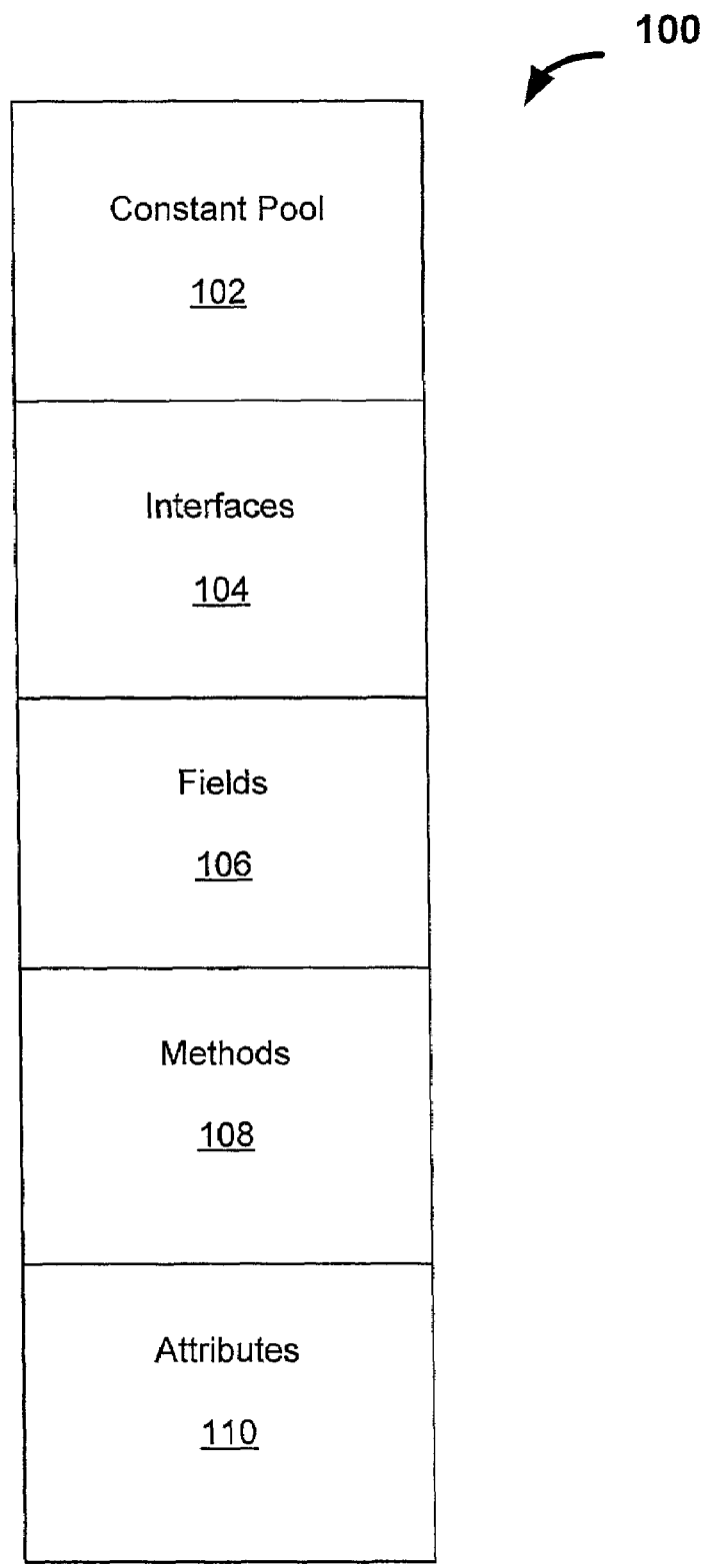
FIG. 1B illustrates a simplified class file.
Figure 2:
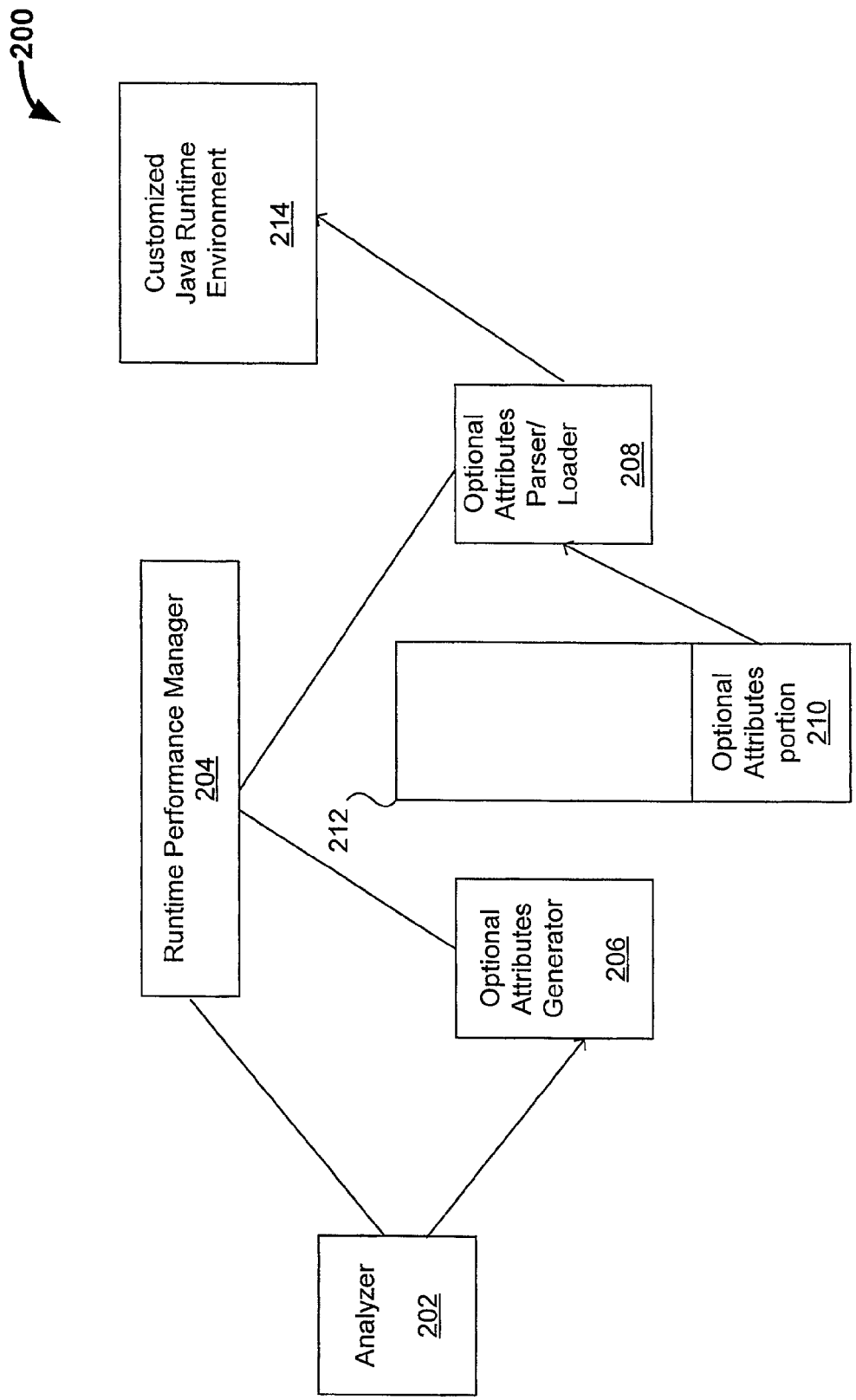
FIG. 2 illustrates a JAVA computing environment in accordance with one embodiment of the invention.

FIG. 2 illustrates a JAVA computing environment 200 in accordance with one embodiment of the invention. The JAVA computing environment 200 includes an analyzer 202, a runtime performance manager 204, an optional attributes generator 206, an optional attributes parser/loader 208, and an optional attributes portion 210 implemented in the attributes table portion of a class file 212. As will be appreciated, these components provide a customized JAVA runtime environment 214 that is customized for a particular JAVA application.

The analyzer 202 can serve as a front-end and perform various tasks associated with profiling the JAVA application. As such, the analyzer 202 can be a compiler extension or tool suitable for analyzing a JAVA application. In any case, the analyzer 202 can operate to mark various JAVA Bytecodes (e.g., Bytecodes of a JAVA method). The marked Bytecodes typically represent JAVA Bytecodes that are associated with JAVA objects that are of interest for a particular application (e.g., Bytecode instructions that create objects that remain active during the execution of the JAVA application, and have a particular size, class, etc.)

Based on the analysis performed by the analyzer 202, the optional attributes generator 206 generates the optional attributes portion 210. As will be appreciated, the optional attributes portion 210 can be implemented in the attributes portion of the class file 212. The optional attributes can, for example, be implemented in accordance with the invention described in the Patent Application entitled "FRAMEWORKS FOR ACCESSING JAVA CLASS FILES", filed May 9, 2001, now U.S. Pat. No. 6,799,185) and hereby incorporated herein by reference.

The optional attributes parser/loader 208 can, in turn, parse and load the optional attributes 210 generated by the optional attributes generator 206. As will be appreciated, the optional attributes 210 can be used to indicate how to customize the JAVA runtime environment for a particular application. By way of example, the optional attributes 210 may indicate which features of the JAVA runtime environment need to be loaded (i.e., only marked features will be loaded). As another example, the optional attributes 210 may indicate that some JAVA objects require special treatment at runtime (e.g., objects that remain active throughout the execution of the JAVA application may be allocated in a particular portion of the memory).

Thus, through the use of optional attributes, the JAVA runtime environment 214 can be customized to meet the needs of a particular application. In addition, the customization of the JAVA runtime environment can be automated. To achieve automation, the runtime performance manager is provided. The runtime performance manager 204 can interact with the optional attributes generator 206 and optional attributes parser/loader 208 to ensure that attributes are correctly generated and/or features need are loaded. In other words, the runtime performance manager 204, among other things, ensures that the appropriate runtime environment is created (e.g., the required JAVA features are provided in the runtime environment, additional features are provided so that marked JAVA objects can be treated as desired).

Figure 3:
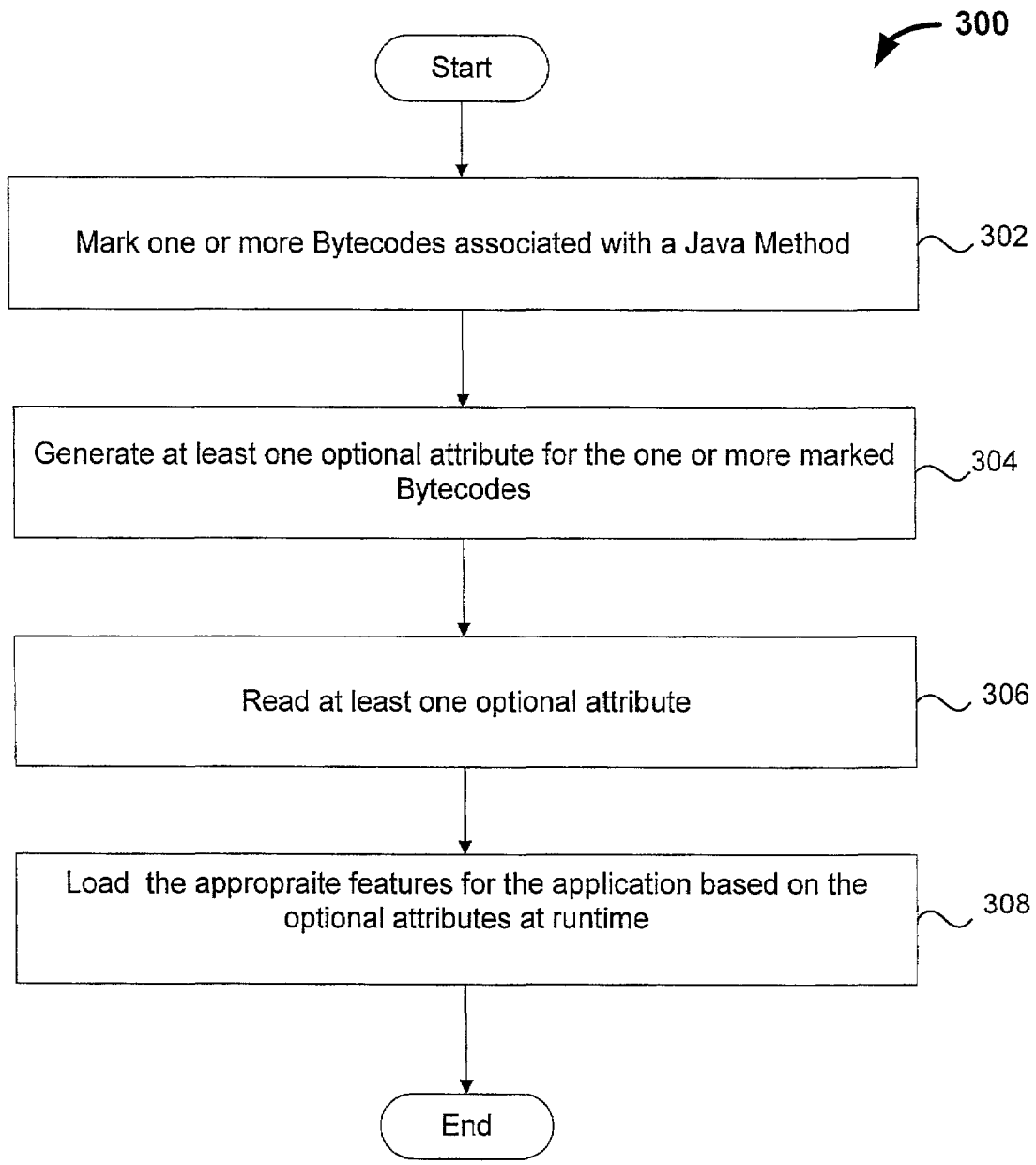
FIG. 3 illustrates a method for customizing JAVA runtime environments in accordance with one embodiment of the invention.

FIG. 3 illustrates a method for customizing JAVA runtime environments in accordance with one embodiment of the invention. Initially, at operation 302, one or more Bytecodes associated with a JAVA method are marked. The marked Bytecodes typically represent instructions that are associated with JAVA objects that are of interest for a particular application. As noted above, the marking of the Bytecodes can be performed by a compiler extension or a tool suitable for analyzing a JAVA application (e.g., analyzer 202 of FIG. 2). Next, at operation 304, at least one optional attribute is created for the one or more marked Bytecodes. The at least one optional attribute can be created by an optional attributes generator, for example, the optional attributes generator 206 of FIG. 2. The optional generator 206 can generate optional attributes based on the input received from an analyzer and/or runtime performance manager (e.g., runtime performance manager 204 of FIG. 2). It should be noted that the optional attributes are typically created in the attributes table portion of the class file.

After creation of the at least one optional attribute, the method 300 proceeds to operation 306 where the at least one optional attribute is read. The at least one optional attribute can be read by an optional attributes parser/loader (e.g., attributes parser/loader 208 of FIG. 2). The attributes parser/loader operates to extract the optional attributes from the class file. Thereafter, at operation 308, appropriate features for the application are loaded based on the optional attributes. In other words, the JAVA runtime environment is customized for a particular application based on the optional attributes that were read.

As will be appreciated, the loading of the appropriate features can be performed at runtime. Furthermore, this loading can be monitored and/or at least partially performed by a runtime performance manager which can interact with the optional attributes generator and the optional attributes parser/loader.

Figure 4:
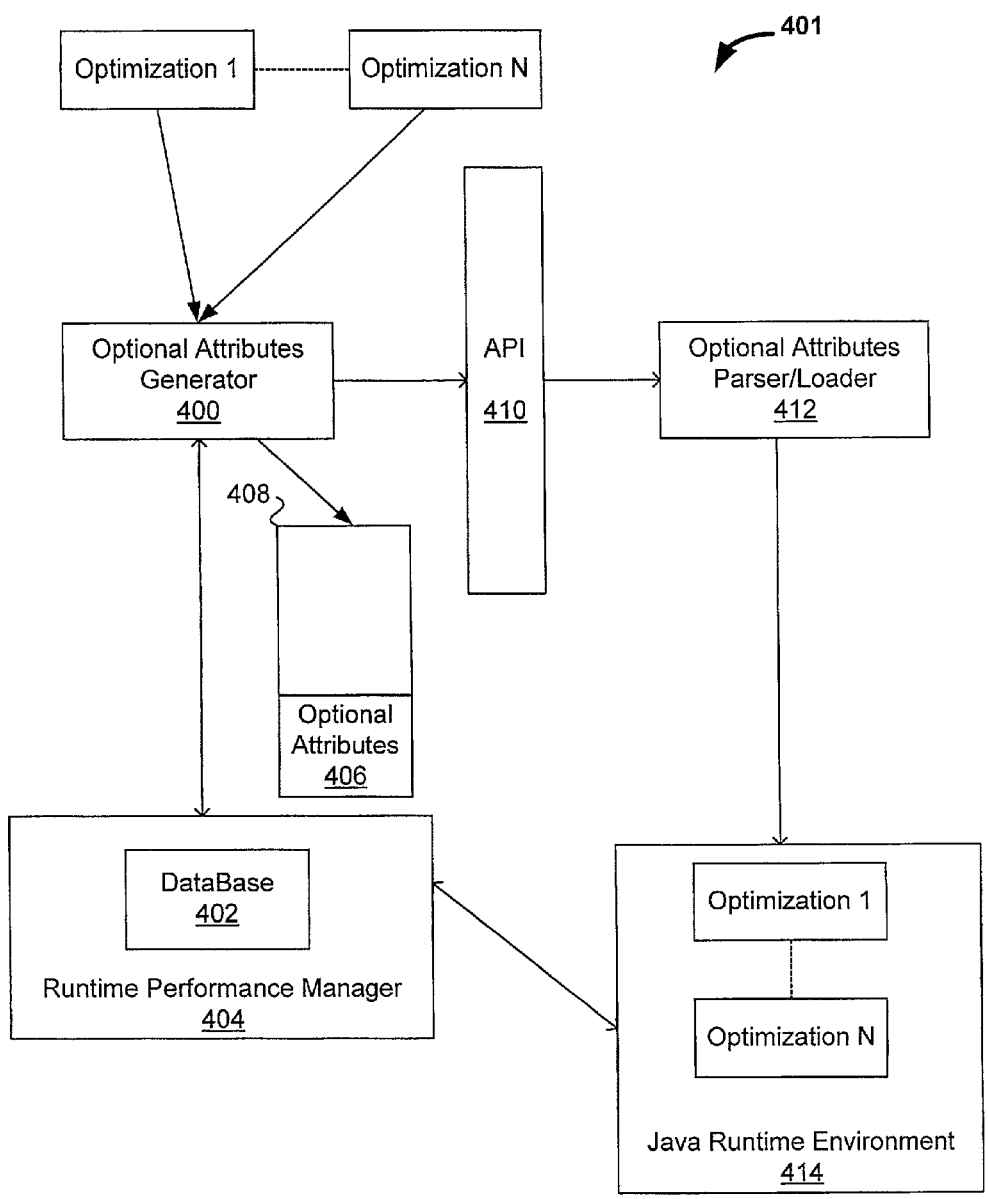
FIG. 4 illustrates an optional attributes generator operating in a JAVA computing environment in accordance with one embodiment of the invention.

FIG. 4 illustrates an optional attributes generator 400 operating in a JAVA computing environment 401 in accordance with one embodiment of the invention. The optional attributes generator 400 receives as input optimizations 1-N, which represent one or more desired optimizations of the JAVA runtime environment. These optimizations can, for example, be JAVA runtime features that need to be loaded for a particular JAVA application. The optimizations can also represent special runtime operations that are to be performed on some objects of a JAVA application.

It should also be noted that optimizations 1-N can be generated by an analyzer (not shown) and/or be stored in a database 402 of a runtime performance manager 404. In any case, based on the optimizations 1-N, the optional attributes generator 400 generates optional attributes 406 in a class file 408. In addition, the optional attributes generator 400 generates an Application Programming Interface (API) 410 that can be used as an interface to an optional attributes parser/loader 412. In one embodiment, the optional attributes generator 400 generates the Application Programming Interface (API) 410 in C programming language. As such, the Application Programming Interface (API) 410 includes functions suitable for performing various operations on the optional attributes 406 of the class file 408 (e.g., read the first optional attribute, get the next optional attribute, get the last optional attribute, find a particular attribute, etc.)

As noted above, the optional attributes parser/loader 412 in conjunction with the runtime performance manger can customize the JAVA runtime environment 414. In other words, the JAVA runtime environment 414 is customized so as to provide the optimizations 1-N. It should be noted that the optional attributes generator 400 can update the database 402. In addition, the optional attributes generator 400 can optionally perform a variety of other tasks. These tasks include generation of a description of attributes, for example, in Extensible Markup Language (XML) format.

Figure 5:
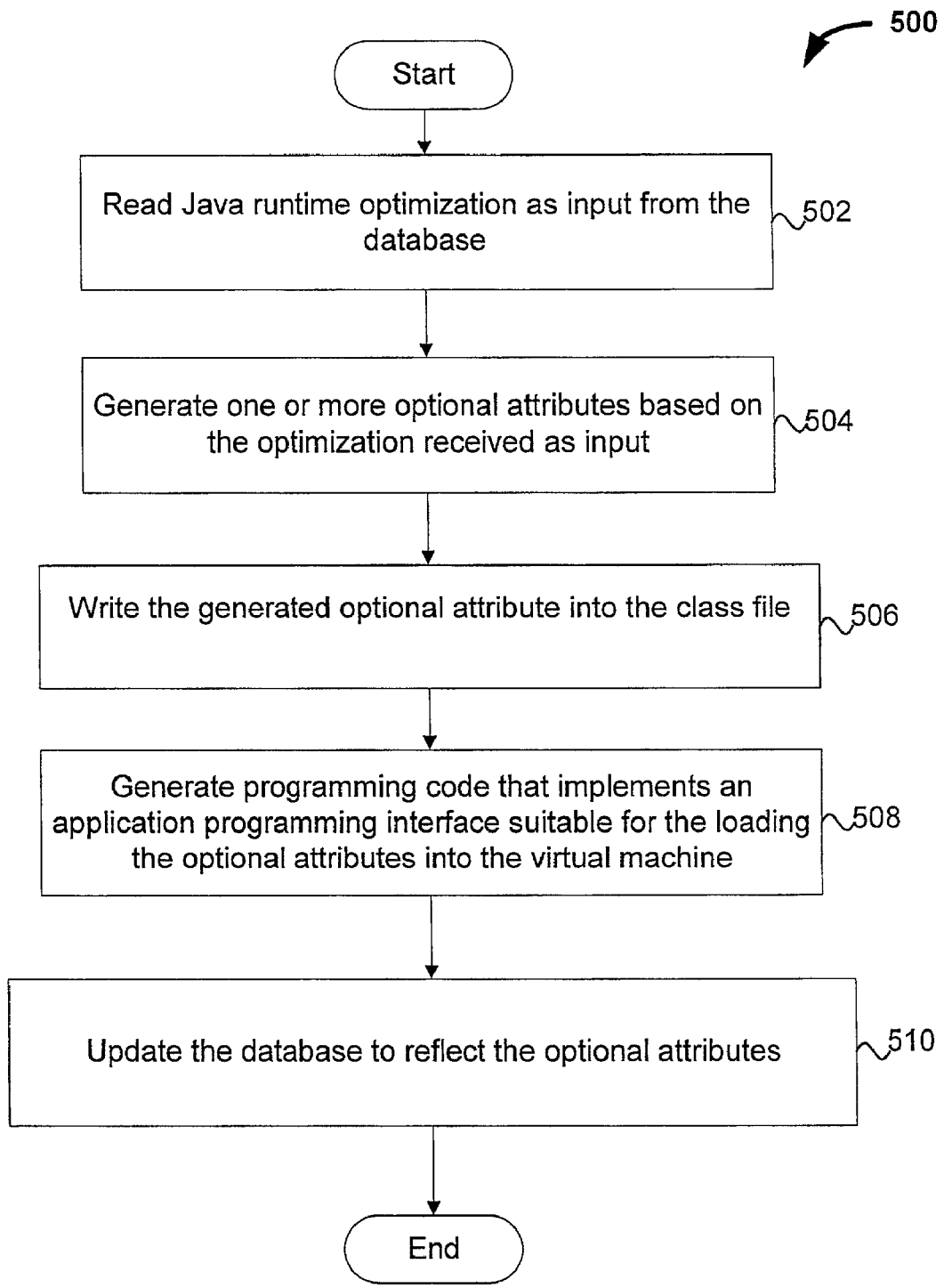
FIG. 5 illustrates a method for generating optional attributes in accordance with one embodiment of the invention.

FIG. 5 illustrates a method 500 for generating optional attributes in accordance with one embodiment of the invention. The method 500 can be used, for example, by the optional attributes generator 400 of FIG. 4. Initially, at operation 502, a JAVA runtime optimization is read from a database as input. Next, at operation 504, one or more optional attributes are generated based on the optimization. Thereafter, at operation 506, the one or more optional attributes are written into a class file that is to be loaded into the virtual machine. At operation 508, appropriate programming code that implements an Application Programming Interface (API) suitable for loading the optional attributes into the virtual machine is generated. Finally, at operation 510, the database is updated to reflect the generated optional attribute(s).

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. In a JAVA computing environment, including a JAVA virtual machine, a method of generating optional attributes in a JAVA class file, said method comprising:

receiving as input JAVA runtime environment optimization information indicating JAVA application bytecodes that are associated with JAVA objects of interest of the Java runtime environment, for the particular JAVA application;

generating one or more optional attributes for said JAVA objects of interest, based on said JAVA runtime environment optimization information;

writing said one or more optional attributes in an attribute table portion of a JAVA class file; and wherein said one or more optional attributes are processed by the JAVA virtual machine to optimize execution of the JAVA virtual machine for the particular JAVA application by controlling how the JAVA objects of interest of the JAVA runtime environment are treated during execution of the particular JAVA application.

2. A method as recited claim 1, wherein said method further comprises:

generating computer program code that implements an application programming interface suitable for loading said one or more optional attributes.

3. A method as recited claim 2, wherein said application programming interface can be used to read said one or more optional attributes from said JAVA class file.

4. A method as recited claim 3, wherein said application programming interface includes functions that can be used to read first, last, and next optional attributes in said JAVA class file.

5. A method as recited claim 3, wherein said application programming interface includes a function suitable for finding an optional attribute in said JAVA class file.

6. A method as recited claim 1, wherein said JAVA runtime environment optimization information is stored in a database.

7. A method as recited in claim 6, wherein said database is generated by a compiler extension or a software tool suitable for analyzing a JAVA application.

8. A method as recited in claim 6, wherein said database is stored in a runtime performance manager that can interact with software modules that generate and load said one or more optional attributes.

9. A method as recited in claim 6, wherein said method further comprises:

updating said database to reflect generation of said one or more optional attributes.

10. An apparatus operable in a JAVA computing environment that, includes a JAVA virtual machine, said apparatus comprising: a JAVA optional attribute generator suitable for generation of optional attributes in a JAVA class file, wherein said JAVA optional attribute generator is further operable to:

receive as input JAVA runtime environment optimization information indicating JAVA application bytecodes that are associated with JAVA objects of interest of the JAVA runtime environment, for the particular JAVA application;

generate one or more optional attributes for said JAVA objects of interest, based on said JAVA runtime environment optimization information;

write said one or more optional attributes in an attribute table portion of a JAVA class file; and wherein said one or more optional attributes are processed by the JAVA virtual machine to optimize execution of the JAVA virtual machine for the particular JAVA application by controlling how the JAVA objects of interest of the JAVA runtime environment are treated during execution of the particular JAVA application.

11. An apparatus as recited in claim 10, wherein said JAVA optional attribute generator is further operable to generate computer program code that implements an application programming interface suitable for loading said one or more optional attributes.

12. An apparatus as recited in claim 10, wherein an application programming interface can be used to read said one or more optional attributes from said JAVA class file.

13. An apparatus as recited in claim 10, wherein said JAVA runtime environment optimization information is stored in a database.

14. An apparatus as recited in claim 10, wherein said database is generated by a compiler extension or a software tool suitable for analyzing a JAVA application.

15. An apparatus as recited in claim 10, wherein said database is stored in a runtime performance manager that can interact with software modules that generate and load said one or more optional attributes.

16. An apparatus as recited in claim 10, wherein said optional attribute is further operable to update said database to reflect generation of said one or more optional attributes.

17. An apparatus as recited in claim 10, wherein said optional attribute generator is further operable to generate a description of an optional attribute.

18. An apparatus as recited in claim 17, wherein said description is in XML format.

19. A computer readable medium including computer program code for generating optional attributes in a JAVA class file for a JAVA computing environment including a JAVA virtual machine, said computer readable medium comprising:

computer program code for receiving as input JAVA runtime environment optimization information indicating JAVA application bytecodes that are associated with JAVA objects of interest of the JAVA runtime environment, for the particular JAVA application;

computer program code for generating one or more optional attributes for said JAVA objects of interest, based on said JAVA runtime environment optimization information;

computer program code for writing said one or more optional attributes in an attribute table portion of a JAVA class file; and wherein said one or more optional attributes are processed by the JAVA virtual machine to optimize execution of the JAVA virtual machine for the particular JAVA application by controlling how the JAVA objects of interest of the JAVA runtime environment are treated during execution of the particular JAVA application.

20. A computer readable medium as recited in claim 19, wherein said method further comprises:

generating computer program code that implements an application programming interface suitable for loading said one or more optional attributes.

21. A computer readable medium as recited in claim 20, wherein said JAVA runtime environment optimization information is stored in a database.

22. A computer readable medium as recited in claim 21, wherein said database is generated by a compiler extension or a software tool suitable for analyzing a JAVA application.

23. A computer readable medium as recited in claim 21, wherein said database is stored in a runtime performance manager that can interact with software modules that generate and load said one or more optional attributes.

24. A computer readable medium as recited in claim 23, wherein said method further comprises:

updating said database to reflect generation of said one or more optional attributes.

25. The method of claim 1, wherein:

the optional attributes indicate to the JAVA virtual machine which objects of interest of the JAVA runtime environment need to be loaded for the particular JAVA application.

26. The method of claim 1, wherein:

the optional attributes indicate to the JAVA virtual machine that some JAVA objects are to be given special treatment at runtime.

27. An apparatus of claim 10, wherein:

the optional attributes indicate to the JAVA virtual machine which objects of interest of the JAVA runtime environment need to be loaded for the particular JAVA application.

28. An apparatus of claim 10, wherein:

the optional attributes indicate to the JAVA virtual machine that some JAVA objects are to be given special treatment at runtime.

29. The computer-readable medium of claim 19, wherein:

the optional attributes indicate to the JAVA virtual machine which objects of interest of the JAVA runtime environment need to be loaded for the particular JAVA application.

30. The computer-readable medium of claim 19, wherein:

the optional attributes indicate to the JAVA virtual machine that some JAVA objects are to be given special treatment at runtime.

* * * * *